(12) United States Patent
Dong

(10) Patent No.: US 12,477,526 B2
(45) Date of Patent: Nov. 18, 2025

(54) WIRELESS SENSING RESOURCE COORDINATION METHOD AND APPARATUS, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 357 days.

(21) Appl. No.: 18/248,918

(22) PCT Filed: Oct. 14, 2020

(86) PCT No.: PCT/CN2020/120914
§ 371 (c)(1),
(2) Date: Apr. 13, 2023

(87) PCT Pub. No.: WO2022/077274
PCT Pub. Date: Apr. 21, 2022

(65) Prior Publication Data
US 2023/0388981 A1    Nov. 30, 2023

(51) Int. Cl.
*H04W 72/0446* (2023.01)
*H04W 84/12* (2009.01)

(52) U.S. Cl.
CPC ........ *H04W 72/0446* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2013/0176897 A1 | 7/2013 | Wang et al. | |
| 2018/0213516 A1 | 7/2018 | Kim et al. | |
| 2018/0288743 A1 | 10/2018 | Choi et al. | |
| 2019/0182674 A1 | 6/2019 | Li et al. | |
| 2021/0045053 A1* | 2/2021 | Lee | H04W 48/16 |
| 2021/0227469 A1* | 7/2021 | Kim | H04W 12/106 |
| 2022/0070710 A1* | 3/2022 | Lim | H04W 72/04 |
| 2023/0319719 A1* | 10/2023 | Kim | G01S 13/82 370/329 |
| 2023/0319877 A1* | 10/2023 | Chitrakar | H04W 24/10 370/329 |

FOREIGN PATENT DOCUMENTS

CN    103260168 A    8/2013

OTHER PUBLICATIONS

C. Silva, B. Sadeghi, C. Chen, C. Cordeiro, WLAN Sensing Procedures and Use Cases, pp. 1-18, August (Year: 2020).*

(Continued)

*Primary Examiner* — Christopher M Crutchfield
(74) *Attorney, Agent, or Firm* — Finnegan, Henderson, Farabow, Garrett & Dunner, L.L.P.

(57) ABSTRACT

A method for coordinating Wireless Local Area Network (WLAN) sensing resources is performed by a wireless access point (AP), and includes: determining a WLAN sensing resource frame, wherein the WLAN sensing resource frame includes WLAN sensing information, and the WLAN sensing information is configured for coordinating a station to send a WLAN sensing request frame; and sending the WLAN sensing resource frame.

18 Claims, 7 Drawing Sheets

| Element ID (Capability information element ID) | Length (Byte length) | Duration1 (Duration information 1) | Information1 (WLAN sensing information1) | Duration2 (Duration information 2) | Information2 (WLAN sensing information2) | ...... |

(56) References Cited

OTHER PUBLICATIONS

Cailian Deng, Xuming Fang, Xiao Han, Xianbin Wang, Li Yan and Rong He, IEEE 802.11be Wi-Fi 7: New Challenges and Opportunities, in IEEE Communications Surveys & Tutorials, vol. 22, No. 4, pp. 2136-2166, Jul. 29 (Year: 2020).*

C. Chen, C. Silve, B. Sadeghi, C. Cordeiro, Overview of WLAN sensing protocol, pp. 1-11, August (Year: 2020).*

International Search Report and Written Opinion of International Application No. PCT/CN2020/120914, dated Jul. 15, 2021, 15 pages.

European Patent Office, Extended European Search Report issued in Application No. 20957055.5 dated Nov. 3, 2023, 11 pages.

* cited by examiner

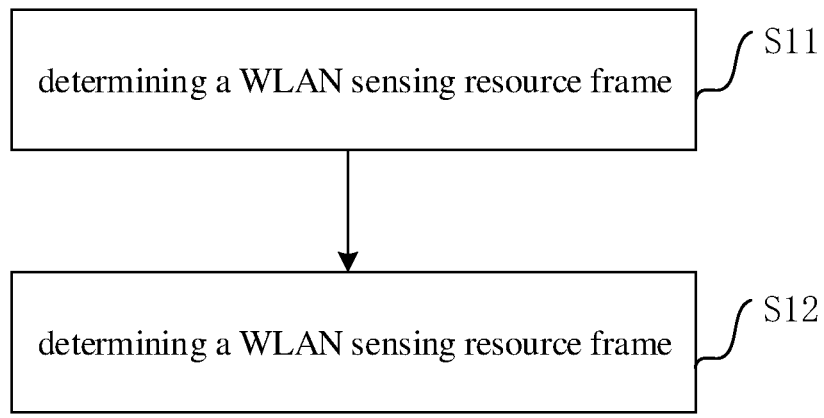

| Element ID (Capability information element ID) | Length (Byte length) | Information1 (Information field 1) | Information2 (Information field 2) | ...... |

FIG. 7A

| Element ID (Capability information element ID) | Length (Byte length) | Information (Information field) |

FIG. 7B

| subelement ID (Capability information subelement ID) | Length (Byte length) | Information1 (Information field 1) | Information2 (Information field 2) | ...... |

FIG. 7C sending a second capability information element ⸺ S31

WIRELESS SENSING RESOURCE COORDINATION METHOD AND APPARATUS, AND STORAGE MEDIUM

CROSS-REFERENCE TO RELATED APPLICATION

This application is a U.S. national phase of International Application No. PCT/CN2020/120914, filed on Oct. 14, 2020, the content of which is incorporated herein by reference in its entirety.

TECHNICAL FIELD

The disclosure relates to a field of wireless communication technology, in particular to a method for coordinating Wireless Local Area Network (WLAN) sensing resources, an apparatus for coordinating WLAN sensing resources, and a storage medium.

BACKGROUND

Wireless local area network sensing (WLAN sensing) is generally used in location discovery under dense scenarios, for example proximity detection and/or presence detection or other application scenarios. And a process of WLAN sensing may be that an initiator initiates WLAN sensing, and multiple responders respond.

In the related art, a station (STA) acts as an initiator of WLAN sensing, and a wireless access point (AP) acts as a responder of WLAN sensing to communicate with the station. However, in the related art, when multiple APs respond to the WLAN sensing initiated by the station at the same time, how to coordinate and control WLAN sensing resources of the multiple APs becomes a key problem to be solved at present.

SUMMARY

According to a first aspect of embodiments of the present disclosure, a method for coordinating WLAN sensing resources is provided. The method is applied to a wireless AP and includes:
determining a WLAN sensing resource frame, in which the WLAN sensing resource frame includes WLAN sensing information, and the WLAN sensing information is configured for coordinating a station to send a WLAN sensing request frame; and sending the WLAN sensing resource frame.

According to a second aspect of embodiments of the disclosure, a method for coordinating Wireless Local Area Network (WLAN) sensing resources is provided. The method is applied to a station and includes:
sending a second capability information element (IE).

According to a third aspect of embodiments of the disclosure, an apparatus for coordinating Wireless Local Area Network (WLAN) sensing resources is provided. The apparatus is applied to a wireless AP and includes:
an AP determining module, configured to determine a WLAN sensing resource frame, in which the WLAN sensing resource frame comprises WLAN sensing information, and the WLAN sensing information is configured for coordinating a station to send a WLAN sensing request frame; and
an AP sending module, configured to send the WLAN sensing resource frame.

According to a fourth aspect of embodiments of the disclosure, an apparatus for coordinating Wireless Local Area Network (WLAN) sensing resources is provided. The apparatus is applied to a station and includes:
a station sending module, configured to send a second capability information element (IE).

According to a fifth aspect of embodiments of the disclosure, an apparatus for coordinating Wireless Local Area Network (WLAN) sensing resources is provided. The apparatus includes:
a processor; and a memory configured to store instructions executable by the processor; in which the processor is configured to perform the method for coordinating WLAN sensing resources according to the first aspect or any embodiment of the first aspect, or the processor is configured to perform the method for coordinating WLAN sensing resources according to the second aspect or any embodiment of the second aspect.

According to a sixth aspect of the disclosure, a non-transitory computer-readable storage medium is provided. When instructions in the storage medium are executed by a processor of a mobile terminal, the mobile terminal is caused to perform the perform the method for coordinating WLAN sensing resources according to the first aspect or any embodiment of the first aspect, or the mobile terminal is caused to perform the method for coordinating WLAN sensing resources according to the second aspect or any embodiment of the second aspect.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the disclosure and serve to explain the principles of the disclosure together with the description.

FIG. 4 is flowchart of a method for coordinating WLAN sensing resources according to an embodiment.

FIG. 5A-FIG. 5B are schematic diagrams showing of a frame format of a WLAN sensing resource frame involved in a method for coordinating WLAN sensing resources according to an embodiment.

FIG. 7A-FIG. 7C are schematic diagrams showing of a format of a capability information element (IE) involved in a method for coordinating WLAN sensing resources according to an embodiment.

FIG. 8 is a block diagram of a WLAN sensing communication system according to an embodiment.

DETAILED DESCRIPTION

Reference will now be made in detail to exemplary embodiments, examples of which are illustrated in the accompanying drawings. The following description refers to the accompanying drawings in which the same or similar numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
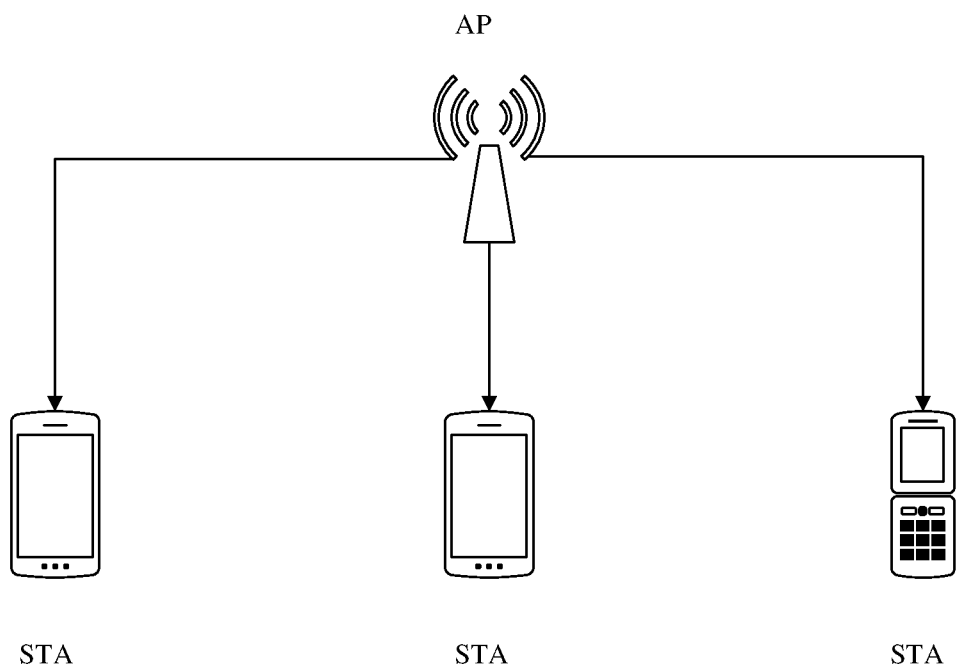
FIG. 1 is a schematic diagram of a WLAN sensing communication system according to an embodiment.

In the wireless communication technology, the IEEE802.11bf task group was established in the IEEE802.11 task group to study WLAN sensing. The WLAN sensing is generally applied to in location discovery under dense scenarios (for example, a home environment, an enterprise environment or the like), for example proximity detection and/or presence detection or other application scenarios. FIG. 1 shows a schematic diagram of a WLAN sensing communication system to which embodiments of the disclosure are applicable. As shown in FIG. 1, wireless communication is performed between the station and the AP. And a process of WLAN sensing may be that an initiator initiates wireless sensing, and multiple responders respond.

The station involved in the disclosure can be understood as a user terminal in a wireless local area network, and the user terminal can be referred to as user equipment (UE), mobile station (MS), mobile terminal (MT), etc., which is a device that provides voice and/or data connectivity to a user. For example, the terminal may be a handheld device or a vehicle-mounted device with a wireless connection function, or the like. At present, some examples of terminals include: mobile phones, pocket personal computers (PPCs), palm-held computers, personal digital assistants (PDAs), notebook computers, tablet computers, wearable devices, Internet of Things (IoT) clients or vehicle-mounted devices, etc. In the disclosure, the AP refers to a device or a router through which a WLAN user terminal accesses the network.

Figure 2:
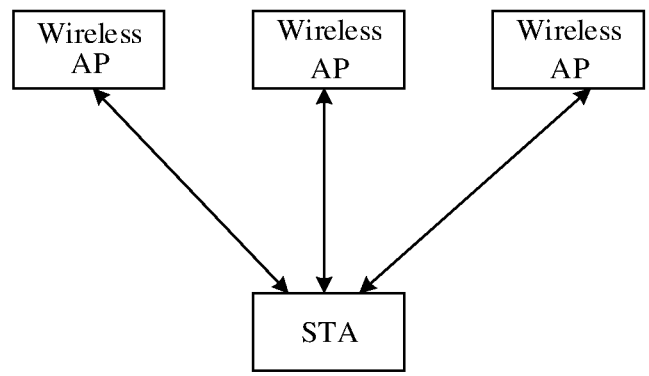
FIG. 2 is a schematic diagram showing that APs are not associated with each other and communicate with a STA according to an embodiment.
Figure 3:
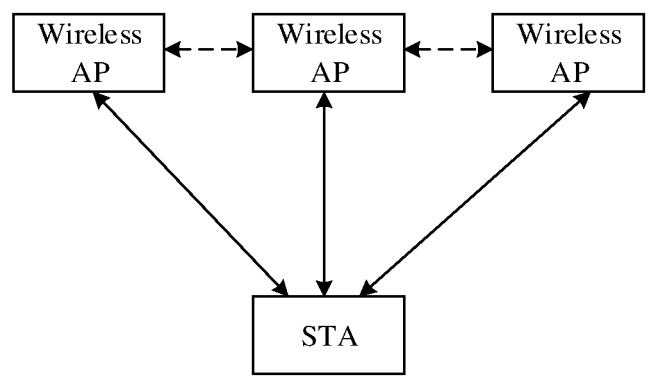
FIG. 3 is a schematic diagram showing that APs are associated with each other and communicate with a STA according to an embodiment.

FIG. 2 is a schematic diagram showing that APs are not associated with each other and communicate with a station according to an embodiment of the disclosure. As shown in FIG. 2, in the related art, a possible way is that respective APs are not associated, the station initiates WLAN sensing, and the APs respond. Another possible way is that respective APs are associated, and FIG. 3 shows a schematic diagram in which APs are associated with each other and communicate with a station according to an embodiment of the disclosure. As shown in FIG. 3, the station initiates WLAN sensing and the APs respond. However, when there is a situation where multiple APs respond to the WLAN sensing initiated by the station at the same time, so that how to coordinate and control WLAN sensing resources of the multiple APs becomes a key problem to be solved at present.

Accordingly, the disclosure provides a method for coordinating WLAN sensing resources to solve how to coordinate and control WLAN sensing resources of multiple APs in a case that the multiple APs respond to WLAN sensing initiated by a station at the same time.

The technical solutions provided by the embodiments of the present disclosure may include the following beneficial effects: the AP sends capability information supported by the AP through the WLAN sensing resource frame in the present disclosure, the coordinating AP coordinates the APs according to the WLAN sensing resources supported by the APs, and further the station is coordinated to send the WLAN sensing request frame, to achieve an effect of reducing mutual interferences of other devices' communication.

FIG. 4 is flowchart of a method for coordinating WLAN sensing resources according to an embodiment. As illustrated in FIG. 4, the method is applied to a wireless AP and includes the following.

At block S11, a WLAN sensing resource frame is determined.

In the embodiment of the disclosure, the WLAN sensing resource frame includes WLAN sensing information, and the WLAN sensing information is configured for coordinating a station to send a WLAN sensing request frame.

At block S12, the WLAN sensing resource frame is sent.

In an exemplary embodiment of the disclosure, each AP determines a WLAN sensing resource including a capability information element (IE). The WLAN sensing resource is in a contention-free period (CFP). And the WLAN sensing resource is formed into a WLAN sensing resource frame, and the WLAN sensing resource is sent in a form of broadcast/multicast.

In the embodiment of the disclosure, the WLAN sensing resource frame includes duration information and first capability IE, and first capability IE has one-to-one correspondence with the duration information. Specifically, the specific application of WLAN sensing initiated by the station corresponds to the duration information of a time period. For example, in one way, the specific application of WLAN sensing initiated by the station is to identify a support of location discovery, then the WLAN sensing used to identify the support of location discovery corresponds to the duration information of a time period. In another way, the specific application of WLAN sensing initiated by the station is to identify a support of proximity detection or presence detection, then the WLAN sensing used to identify the support of proximity detection or presence detection corresponds to the duration information of a time period. In a frame format shown in FIG. 5A, the duration information included in the WLAN sensing resource frame may appear in the frame format shown in FIG. 5A in a form of an IE. Alternatively, the duration information included in the WLAN sensing resource frame may also appear in a frame format shown in FIG. 5B in the form of an IE. The WLAN sensing resource frame includes an ID of a capability IE, a byte length, duration information and WLAN sensing resource information. The station (device) with WLAN sensing identifying a support of this function can perform WLAN sensing. It can be understood that, the one-to-one correspondence between the first capability IE and the duration information may be specified through a protocol or pre-configured.

In an exemplary embodiment of the disclosure, the way of each AP sending the WLAN sensing resource frame may be to send the WLAN sensing resource frame based on a beacon frame through broadcasting, or may be to send the WLAN sensing resource frame based on a WLAN sensing action frame through broadcasting. Of course, each AP sending the WLAN sensing resource frame through broadcasting is an exemplary illustration, and is not a specific limitation to the sending of the WLAN sensing resource frame in the disclosure.

It should be noted in the embodiments of the disclosure that, before the AP sends the WLAN sensing resource frame to coordinate the station to send the WLAN sensing request frame, the AP needs to exchange capability information with the station during an initial association process between the AP and the station. The station sends WLAN sensing capability information to inform the AP of the capability information supported by the station. The AP determines the capability supported by the station according to the WLAN sensing capability information sent by the station, which can be used to subsequently coordinate the station to send the WLAN sensing request frame. The AP can carry its capability information value supporting WLAN sensing in a beacon frame or an association response frame to inform the station of the capability information value. The capability IE may be information on supporting WLAN sensing, or specifically, supporting motion detection in WLAN sensing, such as proximity detection or motion detection, etc. The following embodiments will illustrate the process of the AP coordinating the station to send the WLAN sensing request frames.

Figure 6:
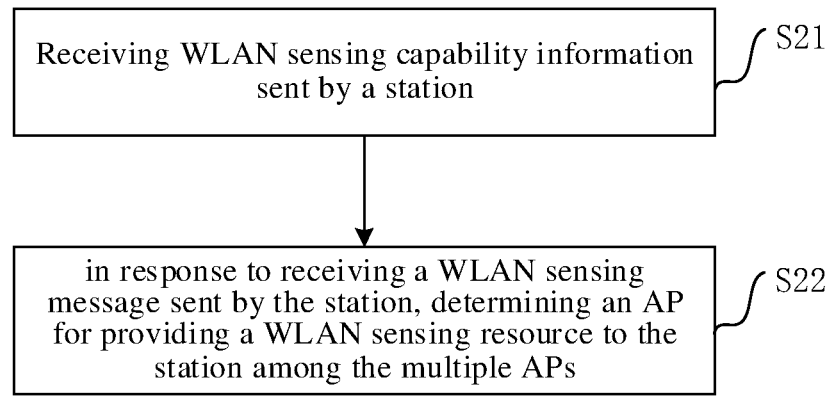
FIG. 6 is flowchart of a method for coordinating WLAN sensing resources according to another embodiment.

FIG. 6 is flowchart of a method for coordinating WLAN sensing resources according to an embodiment. As illustrated in FIG. 6, the method is applied to a terminal and includes the following.

At block S21, WLAN sensing capability information sent by a station is received.

In the embodiment of the disclosure, the WLAN sensing capability information is configured to identify a second capability IE about the station supporting WLAN sensing. The AP determines the second capability IE about the WLAN sensing of the station based on the WLAN sensing capability information sent by the station.

At block S22, in response to receiving a WLAN sensing message sent by the station, an AP for providing a WLAN sensing resource to the station is determined among the multiple APs.

In an exemplary embodiment of the disclosure, a coordinating AP determines the first capability IE of each AP according to WLAN sensing resource frames sent by coordinated APs, or according to WLAN sensing resource frames reported by coordinated APs. After detecting that the station sends a WLAN sensing message, i.e., the AP receives the WLAN sensing message sent by the station, the AP makes a response to the received WLAN sensing message. The first capability IE of the AP for providing the WLAN sensing resource to the station matches the second capability IE.

Further, the one-to-one correspondence between the first capability IE and the duration information included in the WLAN sensing resource included in each AP is determined based on the WLAN sensing resource frame sent by each AP. The duration information, that is, the duration involved in the above embodiment, is determined, and the first capability IE corresponding to the duration information is determined among the multiple APs according to the one-to-one correspondence between the first capability IE and the duration information included in the WLAN sensing resource included in each AP. For example, if the station identifies its capability information of supporting WLAN sensing, the AP carries duration information 1 corresponding to the WLAN sensing capability information in the WLAN sensing resource frame. Alternatively, if the station carries specific capability information, for example, the station carries proximity detection capability information, the AP carries duration information 2 corresponding to the proximity detection capability information.

As described above, in the embodiment of the disclosure, before the AP sends the WLAN sensing resource frame to coordinate the station to send the WLAN sensing request frame, each AP needs to exchange capability information with the station during an initial association between the AP and the station. The station may carry the second capability IE in an initial association request frame, or carry the second capability IE in a pre-association request frame. The AP determines the second capability IE of the station according to the received initial association request frame or the pre-association request frame. The AP may carry the first capability IE in an initial association response frame, or carry the first capability IE in a pre-association response frame. The station may determine the first capability IE supported by the AP according to the received initial association response frame or the pre-association response frame sent by the AP. The second capability IE is carried in the initial association request frame or the pre-association request frame; the first capability IE is carried in the initial association response frame or the pre-association response frame. FIG. 7A to 7C are schematic diagrams showing a format of a capability IE involved in a method for coordinating WLAN sensing resources according to an embodiment. In the embodiment of the disclosure, the format of the first capability IE or the second capability IE may be the frame format shown in FIG. 7A or the frame format shown in FIG. 7B. If the format of the first capability IE or the second capability IE is the frame format shown in FIG. 7B, an information field included in the frame format shown in FIG. 7B includes the first capability IE or the second capability IE. Its format is shown in FIG. 7C, including a sub-element ID, a byte length, and a supported application (for example, information 1 identifies a support of location discovery, and information 2 identifies a support of proximity detection or presence detection).

In an exemplary embodiment of the present disclosure, a way for the coordinating AP to control the coordinated AP to respond to the WLAN sensing message sent by the station may be that, if multiple APs for which WLAN sensing is performed by the station are associated with each other, then the coordinating AP can directly control other coordinated APs to respond to the WLAN sensing message sent by the station. Another way is that if multiple APs for which WLAN sensing is performed by the station are not associated with each other, the coordinating AP can determine whether the coordinated AP supports a pre-association security negotiation (PASN) capability, and in response to the coordinated AP supporting the PASN capability, the coordinating AP controls the coordinated AP that supports the PASN capability to respond to the WLAN sensing message sent by the station. The coordinated AP that does not support the PASN capability does not respond to the WLAN sensing message sent by the station.

According to the above embodiments, the method for coordinating WLAN sensing resources provided by the disclosure reduces interference to other stations (devices) by means of coordinating coordinated APs by the coordinating AP and further coordinating the station to send the WLAN sensing request frame.

In the embodiment of the disclosure, according to the received WLAN sensing resource frames sent by other coordinated APs, in one way, the coordinating AP may determine a time of determining the first capability IE of each AP based on a communication time of performing broadcast by the AP. The communication time of performing broadcast by the AP may be a communication time between stations (P2P), or a contention period (CP), or a CFP. In another way, a time of determining the first capability IE of each AP may be determined based on a time at which the AP reports the WLAN sensing resource frame. By determining the first capability IE of each AP included in the WLAN sensing resource frame in the above manner, a problem of information loss caused by the conflict in communication time can be avoided.

In an embodiment, the initial association request frame includes any one or a combination of the following:

an ID of a WLAN sensing capability IE, a duration, a location, a proximity detection or a presence detection.

The WLAN sensing resource frame includes any one or a combination of the following an ID of a WLAN sensing capability IE, a duration, a location, a proximity detection or a presence detection.

It should be understood that in the embodiments of the disclosure, the first capability IE is the same as the second capability IE. For the convenience of description, the present disclosure refers to the capability IE supported by the AP as the first capability IE, and refers to the capability IE supported by the station as the second capability IE.

Based on the same/similar concept, the embodiments of the present disclosure also provide a method for coordinating WLAN sensing resources.

FIG. 8 is a flowchart showing a method for coordinating WLAN sensing resources according to an embodiment. As illustrated in FIG. 8, the method is applied in a station and includes the following.

At block S31, a first capability IE is sent.

In the embodiment, before an AP sends a WLAN sensing resource frame to coordinate the station to send a WLAN sensing request frame, the AP needs to exchange capability information with the station during an initial association process between the AP and the station. The station sends WLAN sensing capability information to inform the AP of the capability information supported by the station. The AP determines the capability supported by the station according to the WLAN sensing capability information sent by the station, which can be used to subsequently coordinate the station to send the WLAN sensing request frame. In the embodiment, the AP can carry its capability information value supporting WLAN sensing in a beacon frame or an association response frame to inform the station of the capability information value. The capability IE may be information on supporting WLAN sensing, or specifically, supporting motion detection in WLAN sensing, such as proximity detection or motion detection, etc. The station may carry the second capability IE in an initial association request frame or in a pre-association request frame.

In an embodiment, the initial association request frame includes any one or a combination of the following:

an ID of a WLAN sensing capability IE, a duration, a location, a proximity detection or a presence detection.

Based on the same concept, the embodiments of the present disclosure also provide an apparatus for coordinating WLAN sensing resources.

It can be understood that, in order to implement the above-mentioned functions, the apparatus for coordinating WLAN sensing resource provided by the embodiments of the disclosure includes corresponding hardware structures and/or software modules for executing respective functions. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 9:
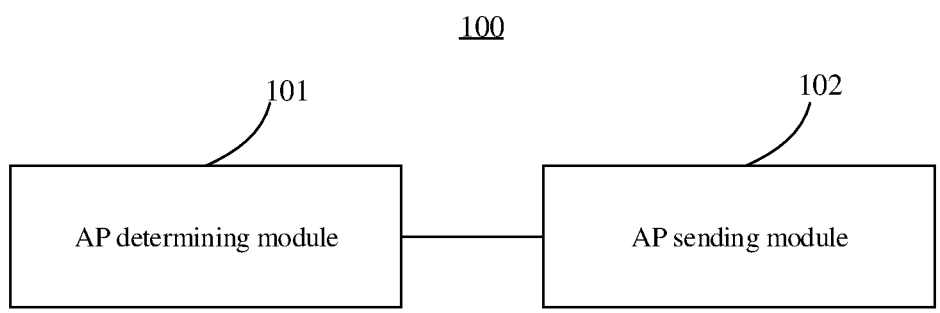
FIG. 9 is a block diagram of an apparatus for coordinating WLAN sensing resources according to an embodiment.

FIG. 9 is a block diagram of an apparatus 100 for coordinating WLAN sensing resource according to an embodiment. As illustrated in FIG. 9, the apparatus is applied in a wireless AP and includes an AP determining module 101 and an AP sending module 102.

The AP determining module 101 is configured to determine a WLAN sensing resource frame, in which the WLAN sensing resource frame comprises WLAN sensing information, and the WLAN sensing information is configured for coordinating a station to send a WLAN sensing request frame. The AP sending module 102 is configured to send the WLAN sensing resource frame.

In an embodiment, the WLAN sensing resource frame includes duration information and a first capability information element (IE), and the first capability IE has one-to-one correspondence with the duration information.

In an embodiment, the AP sending module 102 is configured to: send the WLAN sensing resource frame based on a beacon frame; or send the WLAN sensing resource frame based on the WLAN sensing action frame.

In an embodiment, the apparatus is further configured to:
receive WLAN sensing capability information sent by the station, in which the WLAN sensing capability information is configured to identify a second capability IE about the station supporting WLAN sensing; and in response to receiving a WLAN sensing message sent by the station, determine an AP for providing a WLAN sensing resource to the station among multiple APs, in which the first capability IE of the AP for providing the WLAN sensing resource to the station matches the second capability IE.

In an embodiment, the AP determining module 101 is configured to: determine the duration information; and determine the first capability IE corresponding to the duration information among the multiple APs.

In an embodiment, the second capability IE is determined based on an initial association request frame sent by the station.

In an embodiment, the multiple APs responding to the WLAN sensing of the station are associated with each other.

In an embodiment, the multiple APs are not associated with each other and support a pre-association security negotiation (PASN) capability.

In an embodiment, the AP determining module is configured to: determine a time of determining the first capability IE based on a communication time of performing broadcast by the AP; or determine a time of determining the first capability IE based on a time at which the AP reports the WLAN sensing resource frame.

In an embodiment, the initial association request frame includes any one or a combination of the following:

an ID of a WLAN sensing capability IE, a duration, a location, a proximity detection or a presence detection.

In an embodiment, the WLAN sensing resource frame includes any one or a combination of the following an ID of a WLAN sensing capability IE, a duration, a location, a proximity detection or a presence detection.

Figure 10:
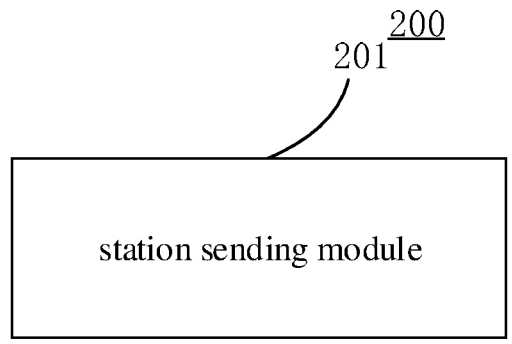
FIG. 10 is a block diagram of an apparatus for coordinating WLAN sensing resources according to another embodiment.

FIG. 10 is a block diagram of an apparatus 200 for coordinating WLAN sensing resource according to an embodiment. As illustrated in FIG. 10, the apparatus is applied in a station and includes a station sending module 201.

The station sending module 201 is configured to send a second capability information element (IE).

In an embodiment, the second capability IE is sent based on an initial association request frame.

In an embodiment, the initial association request frame includes any one or a combination of the following:

an ID of a WLAN sensing capability IE, a duration, a location, a proximity detection or a presence detection.

Regarding the apparatus in the above embodiments, the specific way in which each module performs its operation has been described in detail in the embodiments related to the method, and will not be described in detail here.

Figure 11:
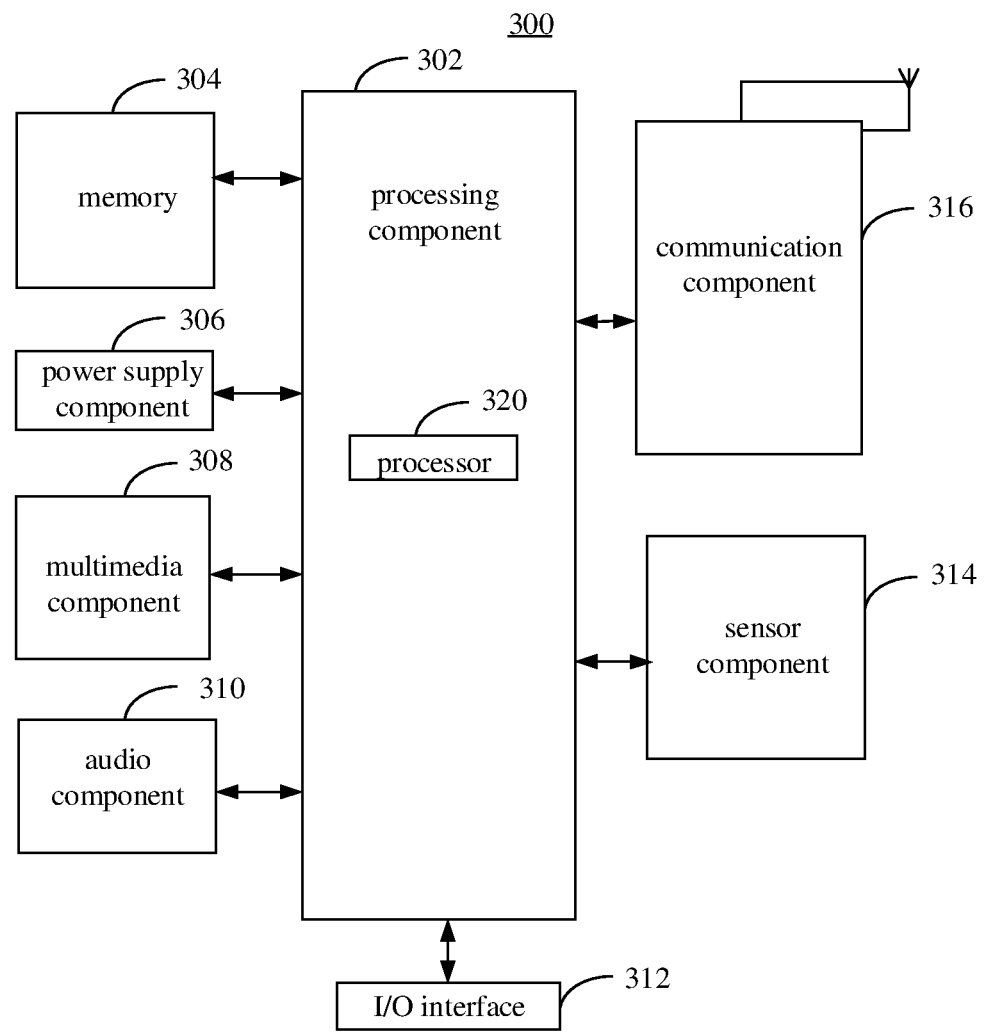
FIG. 11 is a block diagram of an apparatus according to an embodiment.

FIG. 11 is a block diagram of an apparatus 300 for coordinating WLAN sensing resource according to an embodiment. For example, the apparatus 300 may be a terminal such as a smart phone, a computer, a digital broadcast terminal, a messaging device, a game console, a tablet device, a medical device, a fitness device, a personal digital assistant, and the like.

As illustrated in FIG. 11, the apparatus 300 may include one or more components: a processing component 302, a memory 304, a power supply component 306, a multimedia component 308, an audio component 310, an input/output (I/O) interface 312, a sensor component 314, and a communication component 316.

The processing component 302 generally controls the whole operation of the apparatus 300, such as the operations related to display, phone call, data communication, camera operation and recording operation. The processing component 302 may include one or more processors 320 to perform instructions, to complete all or part of steps of the above method. In addition, the processing component 302 may include one or more modules for the convenience of interaction between the processing component 302 and other components. For example, the processing component 302 may include a multimedia module for the convenience of interaction between the multimedia component 308 and the processing component 302.

The memory 304 is configured to store all types of data to support the operation of the apparatus 300. Examples of the data include the instructions of any applications or methods operated on the apparatus 300, contact data, phone book data, messages, pictures, videos, etc. The memory 304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 306 may provide power for all components of the apparatus 300. The power supply component 306 may include power supply management system, one or more power supplies, and other units related to generating, managing and distributing power for the apparatus 300.

The multimedia component 308 includes a display screen of an output interface provided between the apparatus 300 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action. In some embodiments, the multimedia component 308 includes a front camera and/or a rear camera. When the apparatus 300 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 310 is configured as output and/or input signal. For example, the audio component 310 includes a microphone (MIC). When the apparatus 300 is in operation mode, such as call mode, record mode, and speech recognition mode, the microphone is configured to receive the external audio signals. The audio signals received may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The buttons may include but not limited to a home button, a volume button, a start button and a lock button.

The sensor component 314 includes one or more sensors, configured to provide various aspects of status assessment for the apparatus 300. For example, the sensor component 314 may detect the on/off state of the apparatus 300 and the relative positioning of the component. For example, the component is a display and a keypad of the apparatus 300. The sensor component 314 may further detect the location change of the apparatus 300 or one component of the apparatus 300, the presence or absence of contact between the user and the apparatus 300, the orientation or acceleration/deceleration of the apparatus 300, and the temperature change of the apparatus 300. The sensor component 314 may include a proximity sensor, which is configured to detect the existence of the objects nearby without any physical contact. The sensor component 314 may further include a light sensor such as CMOS or CCD image sensor, which is configured to use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the apparatus 300 and other devices. The apparatus 300 may access wireless networks based on a communication standard, such as Wi-Fi, 2G, or 3G, or their combination. In an exemplary embodiment, the communication component 316 receives broadcast signals or broadcast-related information from an external broadcast management system via a broadcast channel. In an exemplary embodiment, the communication component 316 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In an embodiment, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above.

In an exemplary embodiment, a non-transitory computer-readable storage medium is further provided which includes instructions, such as the memory 304 including instructions, in which the instructions may be executed by the processor 320 of the apparatus 300 to complete the above method. For example, the non-transitory computer-readable storage medium may be a ROM, a random access memory (RAM), a CD-ROM, a magnetic tape, a floppy disk, an optical data storage device, etc.

Figure 12:
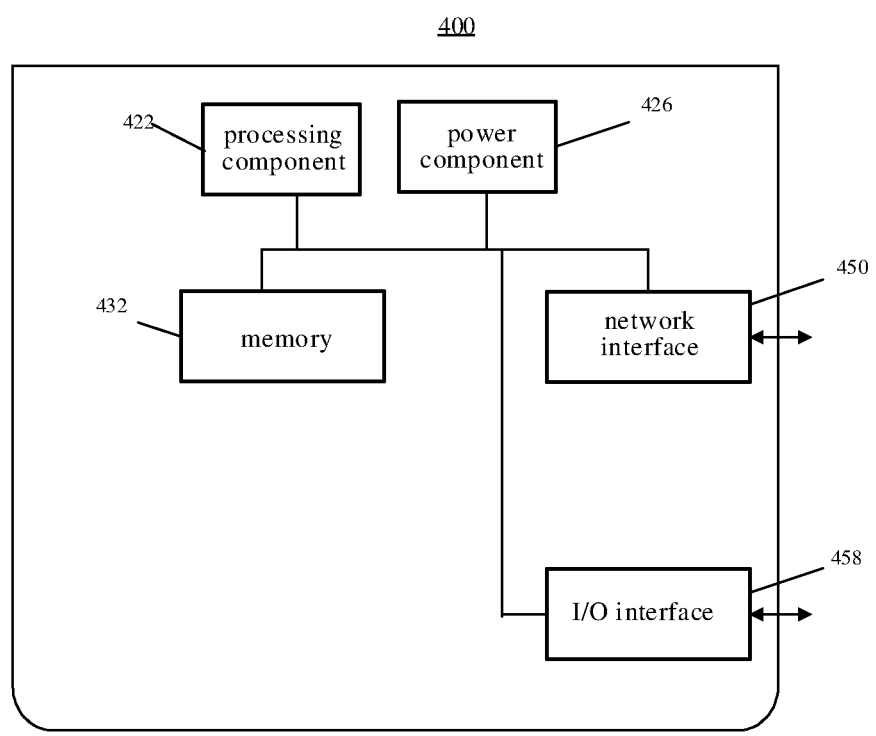
FIG. 12 is a block diagram of an apparatus according to an embodiment.

FIG. 12 is a block diagram of an apparatus 400 for coordinating WLAN sensing resource according to an embodiment. For example, the apparatus 400 may be provided as a server. As illustrated in FIG. 5, the apparatus 400 includes a processing component 422, which includes one or more processors, and a memory resource represented by a memory 432 for storing instructions executable by the processing component 422, such as application programs. The application program stored in the memory 432 may include one or more modules, each module corresponds to a set of instructions. In addition, the processing component 422 is configured to execute instructions to perform the method described above and applied to the network side device.

The apparatus 400 may also include a power component 426 configured to perform power management of the apparatus 400, a wired or wireless network interface 450 configured to connect the apparatus 400 to the network, and an I/O interface 458. The apparatus 400 may operate based on an operating system stored on the memory 432, such as Windows Server™, Mac OS X™, Unix™, Linux™, FreeBSD™ or the like.

It should be further understood that in the present disclosure, the term "a plurality of" refers to two or more, and other quantifiers are similar. The term "and/or", which describes the association relationship of the associated objects, means that there can be three kinds of relationships, for example, A and/or B, which can mean that A exists alone, A and B exist at the same time, and B exists alone. The character "/" generally indicates an "or" relationship between the associated objects. The singular forms "a," "the," and "the" are intended to include the plural forms as well, unless the context clearly dictates otherwise.

It should be understood that although the terms "first", and "second", may be used in this disclosure to describe various information, the information should not be limited to these terms. These terms are only used to distinguish the same type of information from each other and do not imply a particular order or level of importance. In fact, the expressions "first", "second" etc. are used completely interchangeably. For example, without departing from the scope of the disclosure, the first information may also be referred to as the second information, and similarly, the second information may also be referred to as the first information.

It is further to be understood that although the operations in the embodiments of the present disclosure are described in a specific order in the drawings, it should not be construed as requiring that the operations be performed in the specific order shown or the serial order, or requiring to perform all shown operations to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for coordinating Wireless Local Area Network (WLAN) sensing resources, performed by a wireless access point (AP), comprising:
    determining a WLAN sensing resource frame, wherein the WLAN sensing resource frame comprises WLAN sensing information, and the WLAN sensing information is configured for coordinating a station to send a WLAN sensing request frame;
    sending the WLAN sensing resource frame;
    receiving WLAN sensing capability information sent by the station, wherein the WLAN sensing capability information is configured to identify a second capability information element (IE) about the station supporting WLAN sensing; and
    in response to receiving a WLAN sensing message sent by the station, determining an AP for providing a WLAN sensing resource to the station among multiple APs, wherein a first capability IE of the AP for providing the WLAN sensing resource to the station matches the second capability IE.

2. The method according to claim 1, wherein the WLAN sensing resource frame comprises duration information and the first capability IE, and the first capability IE has a one-to-one correspondence with the duration information.

3. The method according to claim 1, wherein sending the WLAN sensing resource frame comprises one of:
    sending the WLAN sensing resource frame based on a beacon frame; or
    sending the WLAN sensing resource frame based on a WLAN sensing action frame.

4. The method according to claim 2, wherein determining the AP for providing the WLAN sensing resource to the station among the multiple APs comprises:
    determining the duration information; and
    determining the first capability IE corresponding to the duration information among the multiple APs.

5. The method according to claim 1, wherein the second capability IE is determined based on an initial association request frame sent by the station.

6. The method according to claim 1, wherein the multiple APs responding to the WLAN sensing of the station are associated with each other.

7. The method according to claim 1, wherein the multiple APs are not associated with each other and support a pre-association security negotiation (PASN) capability.

8. The method according to claim 2, wherein a time of determining the first capability IE is determined based on one of:
    a communication time of performing broadcast by the AP; or
    a time at which the AP reports the WLAN sensing resource frame.

9. The method according to claim 5, wherein the initial association request frame comprises any one or a combination of:

an ID of a WLAN sensing capability IE, a duration, a location, a proximity detection or a presence detection.

10. The method according to claim 1, wherein the WLAN sensing resource frame comprises any one or a combination of:
an ID of a WLAN sensing capability IE, a duration, a location, a proximity detection or a presence detection.

11. A method for coordinating Wireless Local Area Network (WLAN) sensing resources, performed by a station, comprising:
receiving a WLAN sensing resource frame from a wireless access point (AP), wherein the WLAN sensing resource frame comprises WLAN sensing information, and the WLAN sensing information is configured for coordinating the station to send a WLAN sensing request frame;
sending WLAN sensing capability information to the AP, wherein the WLAN sensing capability information is configured to identify a second capability information element (IE) about the station supporting WLAN sensing; and
sending a WLAN sensing message to the AP, wherein the WLAN sensing message is configured to determine an AP for providing a WLAN sensing resource to the station among multiple APs in response to the AP receives the WLAN sensing message sent by the station, wherein a first capability IE of the AP for providing the WLAN sensing resource to the station matches the second capability IE.

12. The method according to claim 11, wherein the second capability IE is sent based on an initial association request frame.

13. The method according to claim 12, wherein the initial association request frame comprises any one or a combination of:
an ID of a WLAN sensing capability IE, a duration, a location, a proximity detection or a presence detection.

14. An apparatus for coordinating Wireless Local Area Network (WLAN) sensing resources, comprising:
a processor; and
a memory for storing instructions executable by the processor;
wherein the processor is configured to:
determine a WLAN sensing resource frame, wherein the WLAN sensing resource frame comprises WLAN sensing information, and the WLAN sensing information is configured for coordinating a station to send a WLAN sensing request frame;
send the WLAN sensing resource frame;
receive WLAN sensing capability information sent by the station, wherein the WLAN sensing capability information is configured to identify a second capability information element (IE) about the station supporting WLAN sensing; and
in response to receiving a WLAN sensing message sent by the station, determine an AP for providing a WLAN sensing resource to the station among multiple APs, wherein a first capability IE of the AP for providing the WLAN sensing resource to the station matches the second capability IE.

15. The apparatus according to claim 14, wherein the WLAN sensing resource frame comprises duration information and the first capability IE, and the first capability IE has one-to-one correspondence with the duration information.

16. The apparatus according to claim 14, wherein sending the WLAN sensing resource frame comprises one of:
sending the WLAN sensing resource frame based on a beacon frame; or
sending the WLAN sensing resource frame based on a WLAN sensing action frame.

17. The apparatus according to claim 15, wherein determining the AP for providing the WLAN sensing resource to the station among the multiple APs comprises:
determining the duration information; and
determining the first capability IE corresponding to the duration information among the multiple APs.

18. The apparatus according to claim 15, wherein a time of determining the first capability IE is determined based on one of:
a communication time of performing broadcast by the AP; or
a time at which the AP reports the WLAN sensing resource frame.

* * * * *